(12) United States Patent
Hassel

(10) Patent No.: US 6,246,919 B1
(45) Date of Patent: Jun. 12, 2001

(54) PRODUCT DATA MANAGEMENT SYSTEM

(75) Inventor: Jörg Hassel, Erlangen (DE)

(73) Assignee: Siemens AG, Munich (DE)

( * ) Notice: Subject to any disclaimer, the term of this patent is extended or adjusted under 35 U.S.C. 154(b) by 0 days.

(21) Appl. No.: 09/043,003

(22) PCT Filed: Jul. 18, 1996

(86) PCT No.: PCT/DE96/01319

§ 371 Date: Jul. 9, 1998

§ 102(e) Date: Jul. 9, 1998

(87) PCT Pub. No.: WO97/05577

PCT Pub. Date: Feb. 13, 1997

(30) Foreign Application Priority Data

Jul. 31, 1995 (DE) .......................................... 295 12 330 U

(51) Int. Cl.$^7$ .................................................. G06F 19/00
(52) U.S. Cl. .......................... 700/116; 700/115; 700/117; 700/118; 700/95; 700/121
(58) Field of Search .................................. 700/115, 116, 700/117, 118, 121, 95

(56) References Cited

U.S. PATENT DOCUMENTS

| | | | | |
|---|---|---|---|---|
| 4,942,534 | * | 7/1990 | Yokoyama et al. | 700/9 |
| 5,153,842 | * | 10/1992 | Dlugos, Sr. et al. | 700/227 |
| 5,491,637 | * | 2/1996 | Kraemer et al. | 700/115 |
| 5,586,038 | * | 12/1996 | Nagaoka | 700/95 |
| 5,625,816 | * | 4/1997 | Burdick et al. | 707/103 |
| 5,654,902 | * | 8/1997 | Scheidt et al. | 702/82 |
| 5,889,674 | * | 3/1999 | Burdick et al. | 700/121 |

FOREIGN PATENT DOCUMENTS

| | | |
|---|---|---|
| 33 13481 | 10/1984 | (DE) . |
| 42 01 293 | 7/1993 | (DE) . |
| 43 12 180 | 10/1994 | (DE) . |
| 478 461 | 4/1992 | (EP) . |
| 495 104 | 7/1992 | (EP) . |
| 2 703 171 | 9/1994 | (FR) . |
| 2703171A | * | 9/1994 | (FR) . |
| 2 176637 | 12/1986 | (GB) . |
| 362071085A | * | 4/1987 | (JP) . |
| WO 93/13966 | 7/1993 | (WO) . |

* cited by examiner

Primary Examiner—Ayaz Sheikh
Assistant Examiner—Frantz B. Jean
(74) Attorney, Agent, or Firm—Birch, Stewart, Kolasch & Birch, LLP.

(57) ABSTRACT

A permanently read- and write-enabled but not easily erasable chip card (C) accompanies a product from manufacturing through recycling. The basic product data are supplemented using read-write devices (SL1 through SL8).

3 Claims, 3 Drawing Sheets

PRODUCT DATA MANAGEMENT SYSTEM

FIELD OF THE INVENTION

The invention relates to a device for product data management during the lifetime of a product.

BACKGROUND INFORMATION

If a product requires accompanying documentation during its lifetime, the relevant data must be stored during pre-manufacturing, manufacturing, assembly, material preparation and servicing up to and including the recycling process. It has been customary to record the product lifetime data on accompanying papers and test reports on site and archive them at a central or decentralized location. One archiving method used is microfilming. Accessing this data, however, is difficult if not impossible.

SUMMARY OF THE INVENTION

An object of the present invention is to keep production and product data available on an electronic product pass during manufacturing, assembly, servicing, and recycling, in compliance with the requirements of the quality systems. Compatibility with quality systems such as ISO 9000 must be ensured.

This object is achieved according to the present invention with a device by assigning the product a chip card-like electronic data medium that is permanently write- and read-enabled but not easily erased, also having both basic product data and the respective optically readable plain text ID, where the basic product data can be supplemented with additional data associated with product lifetime events, such as manufacturing, final testing, rework, shipping, user operation, service and maintenance, disassembly and recycling, using electronic read-write devices.

Thus product quality and configuration are documented during the lifetime of the product in a very simple manner and can be tracked at any time.

The present invention provides the user with particular advantages, such as:
- reduced-paper or paperless documentation and manufacturing control;
- guaranteed product quality trackability during manufacturing, assembly, service, and recycling;
- documentation of test results, rework and maintenance work in the different phases of the product's lifetime;
- ensuring product serviceability and maintainability by documenting modified components (component variants, retrofitting, etc.) or the charge codes used;
- documentation of test results and defective parts for rework control;
- evidence in the case of product liability issues;
- facilitating maintenance work through individual product documentation of the component variants used;
- facilitating the recycling process through documentation of the available spare parts and materials used.

The first exemplary embodiment of the present invention is characterized in that, thanks to special encryption, the read-write devices assigned to lifetime segments only have access to the basic product data and specifically definable subsets of additional data. This ensures security against unauthorized access to the data.

Another exemplary embodiment of the present invention is characterized in that the data of the data medium can be archived in mass storage devices at predefinable points of the product's lifetime, and, for the subsequent life cycle segments, the original data medium can be replaced by a new, similar data medium, which can receive an additional subset of the basic product data and the previous additional data that is still significant for the remaining life of the product. Thus it can be ensured that no data that is irrelevant to the user of a product is stored on the chip card given to said user. Thus not only is the unnecessary use of data storage space avoided, but also confidential manufacturing data that is irrelevant to the user of the product is fully eliminated.

DETAILED DESCRIPTION OF THE INVENTION

Figure 1:
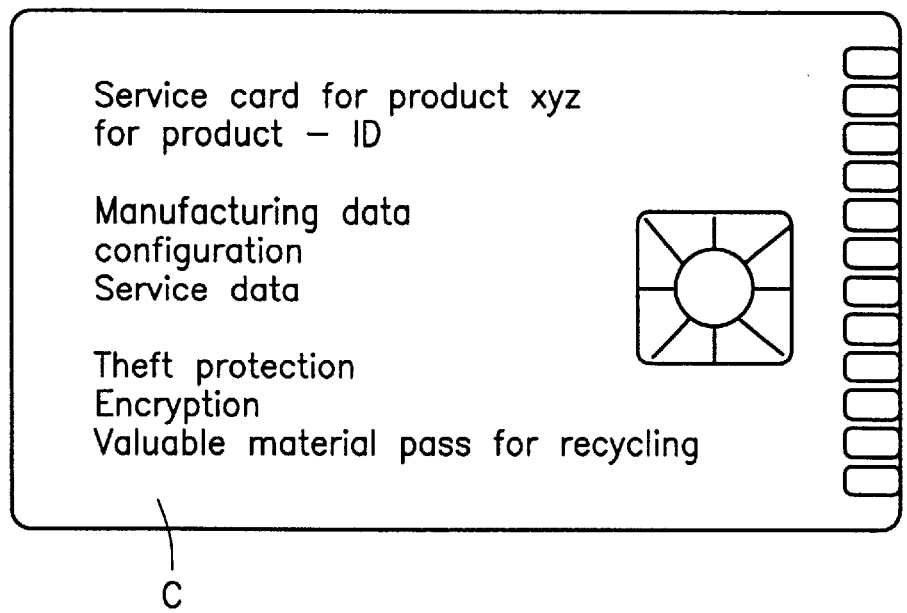
FIG. 1 shows a front view of a chip card.

FIG. 1 shows the front view of a data medium, in this case a chip card C having a high storage capacity. The storage capacity may vary between 8 and 64 MB. Such a chip card C is permanently read- and write-enabled on contact surfaces indicated in the figure as ovals, using read-write devices to be described later. The read-write procedures can, of course, take place via encryption. Of course, contact surfaces such as those used in commercially available telephone cards can also be used here in principle.

Furthermore, chip card C can contain plain text information on basic product data. In FIG. 1, this information is the following:

Service card for product xyz
for product—ID
Manufacturing data
Configuration
Service data
Theft protection
Encryption
Valuable material pass for recycling xyz can denote a motor vehicle type, for example; product ID can be a motor vehicle chassis number. Additional graphic elements, for example, company logos and the like, can be printed on chip card C.

Figure 2:
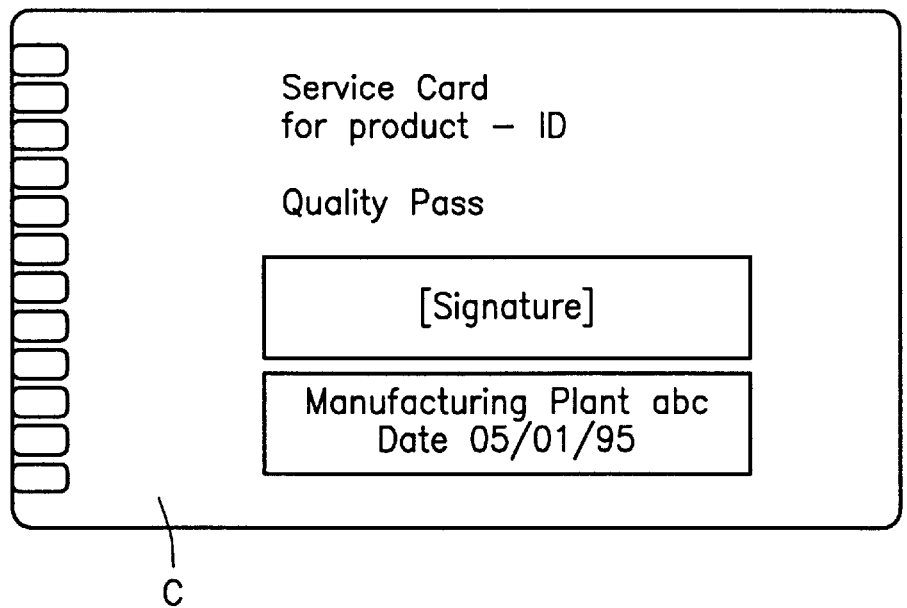
FIG. 2 shows a rear view of a chip card.

FIG. 2 shows the rear side of the above-described chip card C. Also here an imprint can be provided. In the embodiment shown, this imprint may look like the following:

Service card
for product—ID
Quality pass
Signature
Manufacturing Plant abc
Date May 01, 1995 abc may represent the name of the manufacturing plant, e.g., the respective automobile factory, in plain text.

Figure 3A:
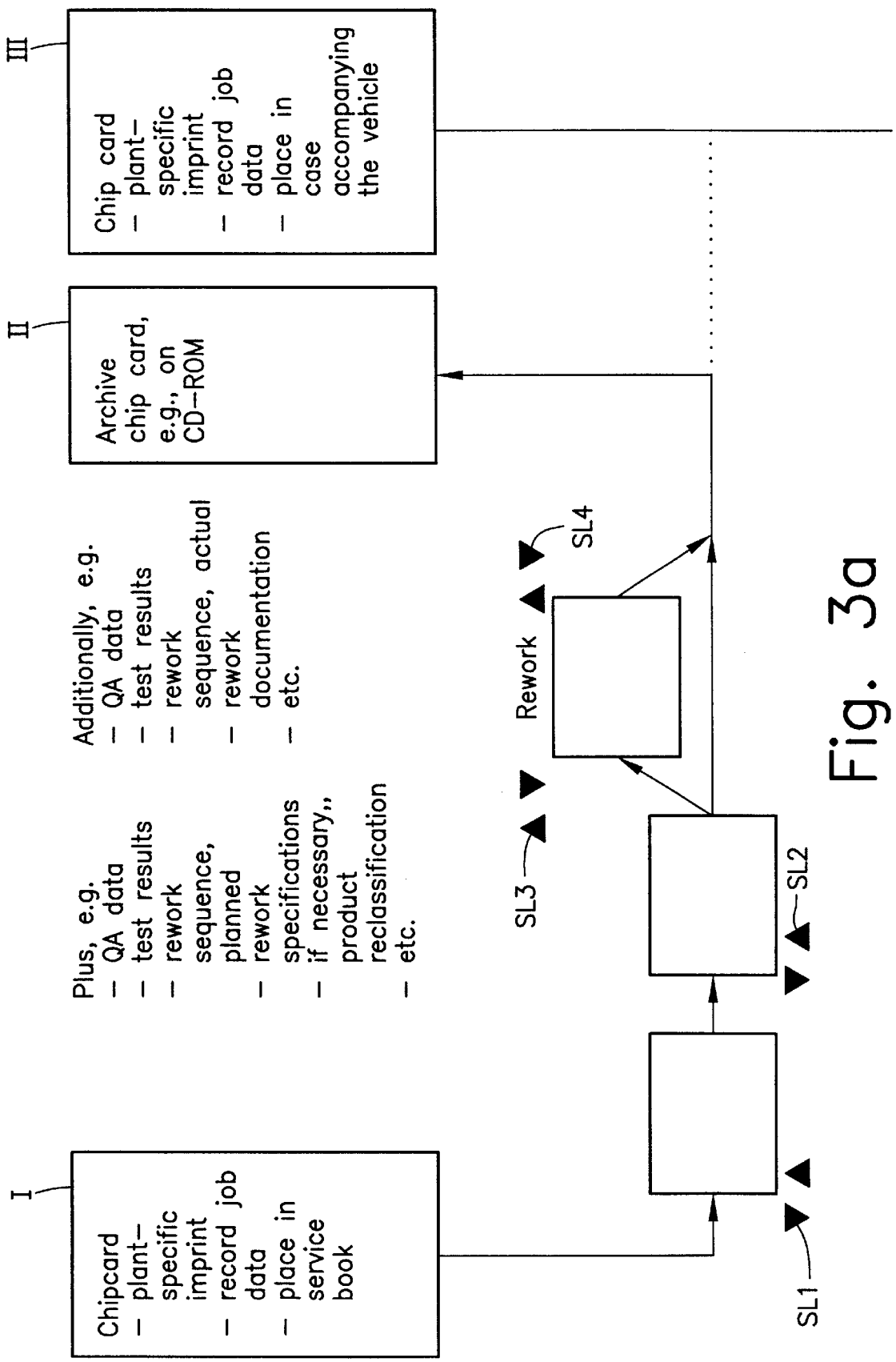
FIG. 3 shows a structure schematic according to the present invention.
Figure 3B:
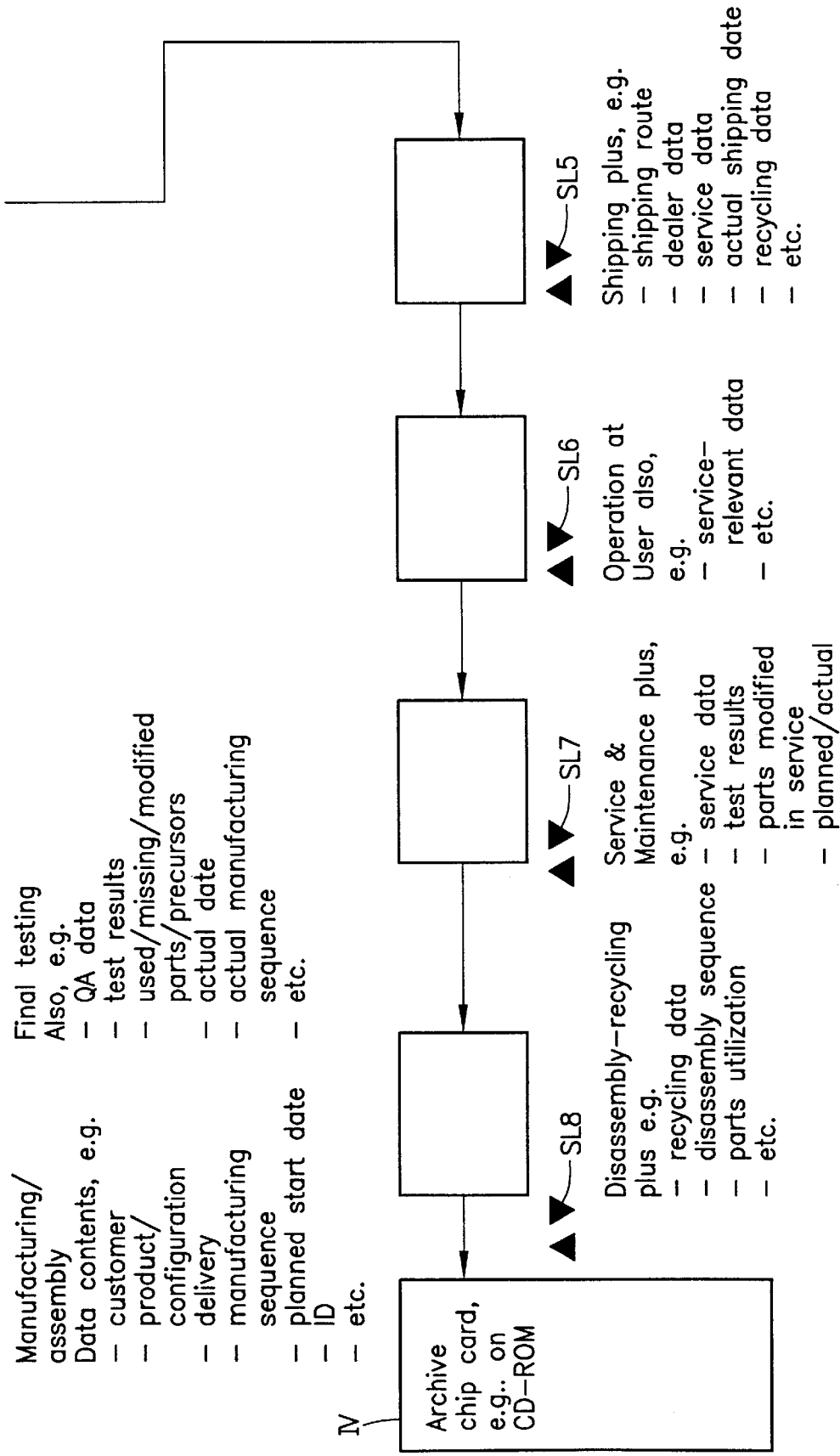

FIG. 3 shows the interaction of read-write devices SL1 through SL8 with chip cards. Initially the chip card is provided with a factory-specific imprint in block I; then basic product data, in particular, job data, are recorded on the chip card using a read-write device not shown for the sake of clarity. Subsequently the chip card is placed in a case accompanying the vehicle and goes first to manufacturing/ assembly with the product. There the previous data is supplemented by a read-write device SL1 with the manufacturing/assembly-specific data. This data may include: customer, product, configuration, delivery, manufacturing sequence, planned start time, and ID information. From manufacturing/assembly, the product goes to final testing, where the additional data associated with final testing is electronically recorded on the chip card using read-write device SL2. This data may include: QA data, test results, parts and/or semifinished products that were used or missing or modified, actual date, and manufacturing sequence.

The flow chart, which shows both the hardware arrangement and the respective process sequence, contains the information that the product may require rework. For this purpose, the following data is supplemented in a read-write device SL3 in a two-step process: QA data, test results, rework sequence planned, rework specifications, and as the case may be, product reclassification. In a read-write device SL4, which is also assigned to the rework step, the following additional data can be recorded: QA data, test results, rework sequence actual, rework documentation.

The product is now completely finished and ready for shipment. The dashed line indicates that the product, with its respective chip card, now goes to shipping, where it receives the following information in a read-write device SL5: shipping route, dealer data, service data, actual shipping date, recycling data. In the subsequent life cycle segment, operation at user, service-relevant data can be entered via a read-write device SL6.

During the Service and Maintenance life cycle segment, the following data can be recorded on the chip card using a read-write device SL7: service data, test results, parts modified in service, planned/actual service dates.

It is also essential for modern product follow-up to consider the disassembly/recycling life cycle segment, where additional information can be recorded on the chip card by read-write device SL8: recycling data, disassembly sequence, parts usage. When the product has reached the end of its life cycle, the chip card data can be documented, in a block IV, using a read-write device that is not shown for the sake of clarity, on a CD-ROM, for example, and this data can be archived. Each read-write device SL1 through SL8 can receive a cryptographic key, so that only one sub-area of the information stored on the chip card can be written and/or read.

Much information is produced during product manufacture that is irrelevant for the subsequent product life cycle and is only to be documented at the manufacturer. For this situation, the original chip card is separated from the actual product in a block II, and the original information is archived at the manufacturer, for example, on a CD-ROM, and a new chip card, similar to the first chip card, containing only the additional data that is relevant for the subsequent life cycle of the product, is produced in a block III. This additional chip card then accompanies the product to the end of its life cycle.

The chip card can also be used for purposes of identification like a car key, or as a vehicle registration card.

What is claimed is:

1. A system, comprising:

a first chip card data storage medium, the first chip card being read-enabled, write-enabled, and non-volatile, and containing a basic product data set and a corresponding optically readable plain text identification, the first chip card being assigned to the product, wherein the basic product data can be supplemented with additional data corresponding to the product's life cycle events, wherein before shipping of the product, the first chip card is separated from the product, data of the first chip card being archived to a mass storage device;

a second chip card data storage medium assigned to the product and replacing the first chip card for a subsequent life cycle of the product, the second chip card being read-enabled, write-enabled, and non-volatile, the second chip card containing a subset of the basic product data set and a subset of the additional data set that is relevant for the user of the product,; and at least one electronic read/write device for writing data to and reading data from the first chip card and the second chip card.

2. The system according to claim 1, wherein the product's life cycle events include manufacturing, final testing, rework, shipping, user operation, service and maintenance, disassembly, and recycling.

3. The system according to claim 1, wherein the at least one electronic read-write device has access to the basic product data set and the additional data.

* * * * *